April 22, 1941.    J. J. MAHONEY    2,239,110
CLEANSING DEVICE FOR DISHES AND THE LIKE
Filed July 12, 1939    2 Sheets-Sheet 2
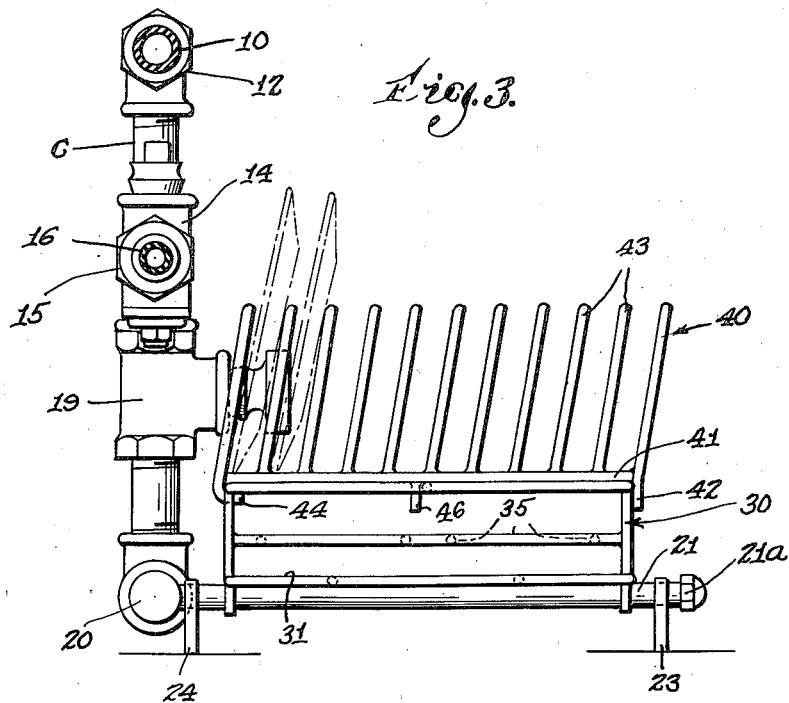
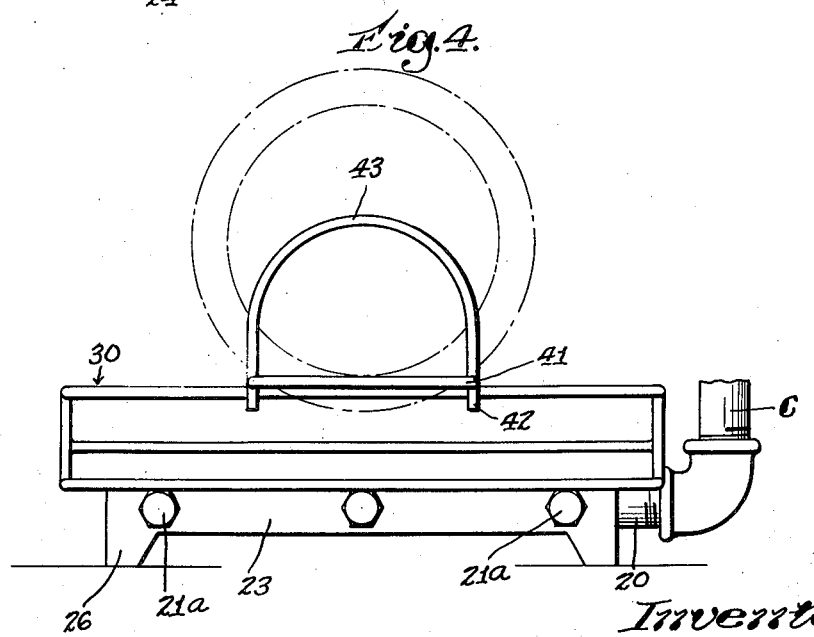
Inventor
John J. Mahoney
by Harold E. Cole
attorney Patented Apr. 22, 1941

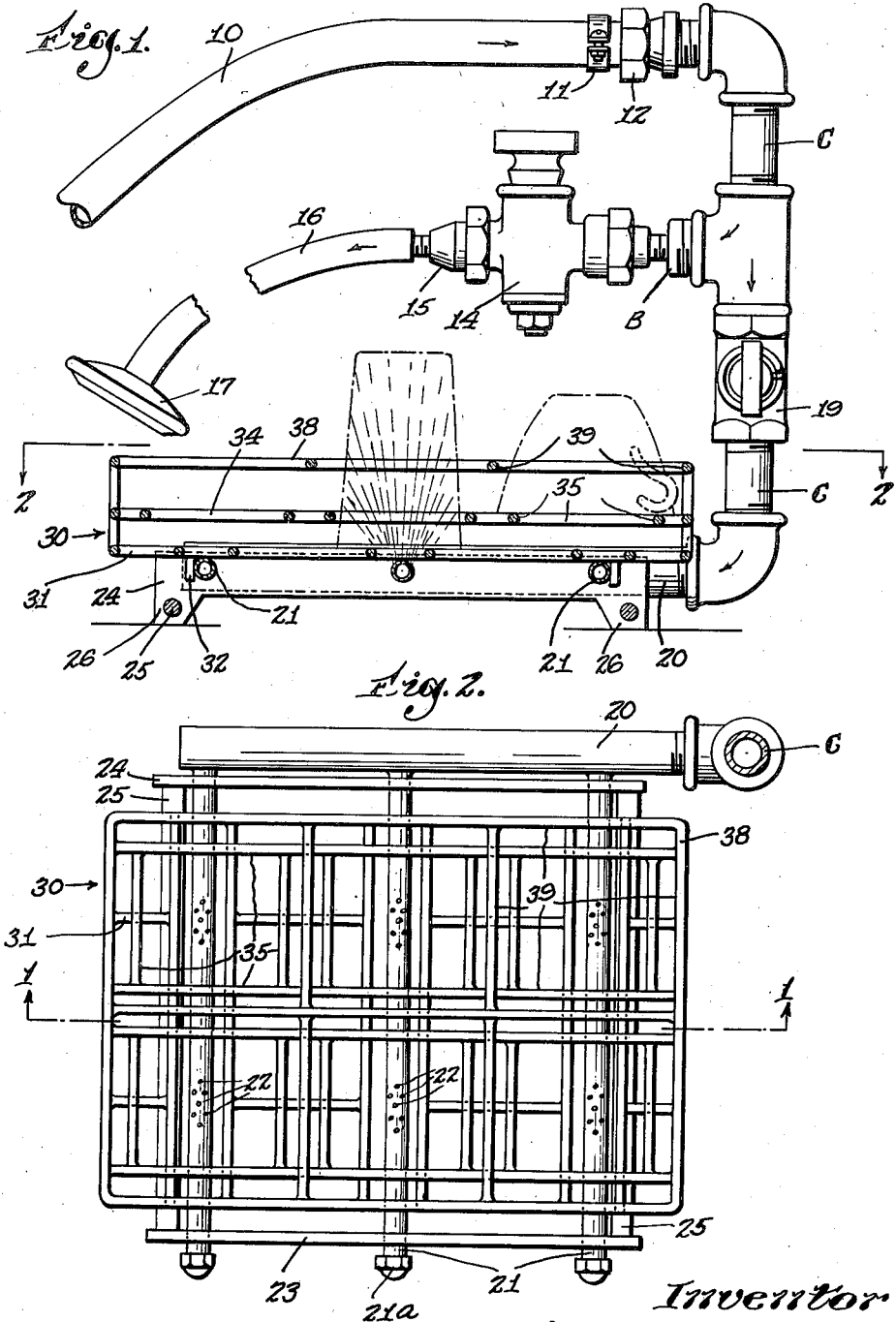

2,239,110

UNITED STATES PATENT OFFICE 2,239,110

CLEANSING DEVICE FOR DISHES AND THE LIKE

John J. Mahoney, Boston, Mass.

Application July 12, 1939, Serial No. 284,043

5 Claims. (Cl. 141—9)

This invention relates to a cleansing device to cleanse drinking glasses, cups, plates and the like.

The common practice today at soda fountains, bars and the like is to wash tumblers and other containers in some soapy water and then rinse them off by dipping them in plain water or holding them by hand over an upwardly directed spray of cold or lukewarm water. This does not properly or thoroughly cleanse them, and it has been my object to construct a device whereby drinking glasses, dishes and the like can be thoroughly cleansed by hot water or steam inside and outside simultaneously. I am aware that others have provided apparatus for this purpose; and it has been my principal object to provide a portable, simple and more convenient apparatus that can be sold for a small sum, and which automatically cleanses in part and thus is adaptable for the small restaurant, bar and soda fountain.

The foregoing and other objects which will appear as the nature of the invention is better understood, may be accomplished by a construction, combination and arrangement of parts such as is disclosed by the drawings and specification. The nature of the invention is such as to render is susceptible to various changes and modifications, and, therefore, I am not to be limited to said disclosure; but am entitled to all such changes therefrom as fall within the scope of my claims.

In the drawings:

Figure 1 is a sectional view of my device taken substantially on the line 1—1 of Figure 2.

Figure 2 is a plan sectional view of my device taken on the line 2—2 of Figure 1.

Figure 3 is a side elevational view of my device with a plate rack assembled thereon, and Figure 4 is a front elevational view of the same partly broken away.

As illustrated, I provide a main supply hose 10 of flexible material which is connected by a collar 11 to a fitting 12 that is part of the main water supply conduit C, which also feeds a branch conduit B that supplies water or steam for rinsing the dishes and glasses. This branch conduit B has a valve 14, a fitting 15 and a rubber spray hose 16 having a spray head 17 through which the hot water or steam, or combination of the two, passes to cleanse the outside of a cup or glass and both sides of a plate. Said main conduit is equipped with a valve 19, both these valves 14 and 19 preferably being the usual regulating valves.

Said main conduit C is in communication with and directly feeds a hollow header pipe 20 from which extends a plurality of communicating tubes 21 which are closed at their ends by caps 21a which can be removed to clean said tubes 21. In the upper portion of each said tube 21 are small ports or orifices 22 which are preferably arranged in groups, as shown in Figure 2 of the drawings, and which are large enough to permit fine streams of water to pass therethrough and forcibly upward. Said tubes 21 are supported by two frame members 23 and 24 near opposite ends thereof, which frame members 23 and 24 are provided with legs 26 in which are fixed tie rods 25 that extend between said frame members 23 and 24 at opposite sides of my device. Said legs 26 space my device from the bottom of the sink so that any accumulation of water in the sink will not touch the dishes being washed.

Supported by said tubes 21 is a rack 30 to support hollow receptacles such as drinking cups and glasses of various sizes, which rack preferably is made of wire and has a bottom 31 which rests on said tubes 21, and which is provided with pins 32 that extend downwardly and serve as guides whereby to position said rack 30 on said tubes 21 and retain it there in a predetermined position. Spaced from and above said bottom 31 is an intermediate member 34 which serves to retain the glasses in position laterally. Said intermediate member 34 has a plurality of drinking glass enclosures which are formed by retainer bars 35, which define rectangles as shown, but which could be round, enclosing spaces adapted to receive drinking glasses which rest on said bottom 31, as illustrated in Figure 1 of the drawings. These retainer bars 35 each enclose a space directly above a group of said orifices 22 so that the liquid streaming through them upwardly will cleanse or sterilize the interior of the drinking glasses with a cleansing means such as a hot, liquid solution. Directly above said bottom 31 and intermediate member 34 is a top member 38 that has a plurality of cup enclosures which are formed by retainer bars 39 that define rectangles, said enclosed spaces being in alinement with but larger than those for the drinking glasses. The cups rest on said intermediate retainer member bars 35, and are retained in position laterally by said retainer bars 39, so that their interior is cleansed in the same manner as explained for the drinking glasses.

In order to make possible the cleansing of flat dishes such as plates or saucers, I provide a separate plate rack 40 which is adapted to extend across said rack 30 and which has a base 41 in the form of a rectangular shaped wire, extending from which base 41 at one extremity are two downwardly extending pins 42 to help maintain said plate rack 40 in a predetermined position on said rack 30. Extending from said base 41 at the opposite end are two hook members 44 which also help to maintain said plate rack 40 in a predetermined position and prevent it from tipping over if packed with plates at one end, inasmuch as any tipping action is prevented by contact of said hook members with an under portion of the top member 38 of said rack 30. Extending from two opposite side members that form said base 41 are plate supporting spacer bars 43 which are substantially crescent-shaped, and which slant slightly as illustrated in Figure 3 of the drawings. This slant may be towards said conduit C or away from it depending upon the position said plate rack 40 is placed in, as it may be reversibly placed on said rack 30, or said plate rack 40 may be placed to extend in a direction at right angles to that shown. There are also holding pins 46 on opposite sides of and at an intermediate point of said plate rack 40 to limit sidewise movement of said plate rack 40.

When using my device to cleanse drinking receptacles only said rack 30 is used, and they may be simultaneously sprayed with water or steam interiorly and exteriorly, the operator using the flexible hose 16 and nozzle 17 to cleanse them on the outside while they are automatically cleansed interiorly by the streams escaping through said orifices 22. When plates are to be cleansed said plate rack 40 is merely placed on said rack 30 and the operator cleanses them as above stated, although depending to a greater extent on the spray nozzle 17 for plates.

In cleansing eating implements such as knives, forks and spoons a perforated hollow container is placed in the space for the drinking glasses in said rack 30 and said implements are placed in upright position in said container and said spray hose 16 and spray head 17 are used to direct the hot water on them.

Said orifices 22 may be varied in size depending upon the size desired of the stream that emanates upwardly through them.

What I claim is:

1. A device for cleansing dishes in combination with a dish supporting rack, said device comprising main conduit means, a header pipe in communication with said main conduit means, other conduit means in communication with said main conduit means adapted to receive a flexible hose, a plurality of tubes spaced apart having orifices in their upper portions in communication with said header pipe, said rack adapted to rest on said tubes and having a bottom member adapted to support drinking glasses or the like and having an intermediate member having bars enclosing spaces adapted to receive said glasses or the like, and having a top member having bars enclosing spaces adapted to receive cups or the like in vertical alinement with said intermediate member spaces and directly above some of said orifices.

2. A device for cleansing dishes in combination with a dish supporting rack, said device comprising supporting means, conduit instrumentalities connected to said supporting means having groups of orifices therein spaced apart, said rack resting on said conduit instrumentalities and having a bottom member, an intermediate member spaced therefrom, and a top member, said three members being in different horizontal planes, said bottom member being adapted to support drinking glasses, said intermediate member having bars providing enclosures for spaces adapted to receive drinking glasses or the like, said top member having bars providing enclosures for spaces greater in size than the first-mentioned spaces and adapted to receive drinking cups, said spaces of said top and intermediate members being so positioned that they are in vertical alinement with each other, said rack being so positioned with relation to said supporting means and said conduit instrumentalities that said spaces are in alinement with groups of said orifices.

3. A device for cleansing dishes in combination with a dish supporting rack, said device comprising main supply conduit means, a header pipe extending horizontally and in communication with said main supply conduit means, a plurality of tubes extending at right angles to said header pipe having groups of orifices therein spaced apart, supporting means for said tubes, said supporting means embodying four legs spaced apart and extending downwardly lower than said tubes, said rack resting on said tubes and having a bottom member, an intermediate member spaced vertically therefrom, and a top member spaced vertically from said intermediate member, said bottom member having bars which are sufficiently close to provide a support for drinking glasses or the like when inverted, said intermediate member having bars providing rectangular enclosures for spaces adapted to receive said drinking glasses or the like, said spaces being directly above a group of said orifices, said top member having bars providing enclosures for spaces greater in size than and in vertical alinement with said intermediate member spaces and adapted to receive drinking cups.

4. A device for cleansing dishes in combination with a dish supporting rack, said device comprising main supply conduit means, a header pipe extending horizontally and in communication with said main supply conduit means, a plurality of tubes extending at right angles to said header pipe having groups of orifices therein spaced apart, two supporting members for said tubes spaced apart and extending transversely to said tubes, each said supporting member embodying two legs spaced apart and extending downwardly lower than said tubes, said rack resting on said tubes and having a bottom member, an intermediate member spaced vertically therefrom, and a top member spaced vertically from said intermediate member, said bottom member having bars which are sufficiently close to provide a support for drinking glasses or the like when inverted, said intermediate member having bars providing rectangular enclosures for spaces adapted to receive said drinking glasses or the like, said spaces being directly above a group of said orifices, said top member having bars providing enclosures for spaces greater in size than and in vertical alinement with said intermediate member spaces and adapted to receive drinking cups, and members extending from said rack downwardly and adapted to contact with said tubes to thereby retain said rack in a predetermined position.

5. A device for cleansing dishes in combination with a dish supporting rack, said device comprising main conduit means, a header pipe in communication with said main condut means, other conduit means in communication with said main conduit means adapted to receive a flexible hose, a plurality of tubes spaced apart having orifices in their upper portion in communication with said header pipe, and extending at right angles thereto, said rack adapted to rest on said tubes, having a bottom member adapted to support drinking glasses or the like and having an intermediate member having bars enclosing spaces adapted to receive said glasses or the like, and having a top member having bars enclosing spaces adapted to receive cups or the like in vertical alinement with said intermediate member spaces and directly above some of said orifices.

JOHN J. MAHONEY.